United States Patent
Zhang et al.

(10) Patent No.: US 11,600,299 B2
(45) Date of Patent: Mar. 7, 2023

(54) VIDEO PROCESSING METHOD AND APPARATUS, TERMINAL, AND STORAGE MEDIUM

(71) Applicant: TENCENT TECHNOLOGY (SHENZHEN) COMPANY LIMITED, Guangdong (CN)

(72) Inventors: Wei Zhang, Shenzhen (CN); Shuai Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/323,459

(22) Filed: May 18, 2021

(65) Prior Publication Data

US 2021/0272598 A1 Sep. 2, 2021

Related U.S. Application Data

(63) Continuation of application No. PCT/CN2020/084463, filed on Apr. 13, 2020.

(30) Foreign Application Priority Data

Apr. 29, 2019 (CN) .......................... 201910356842.3

(51) Int. Cl.
*G11B 27/00* (2006.01)
*G11B 27/10* (2006.01)
*H04N 21/472* (2011.01)

(52) U.S. Cl.
CPC .......... *G11B 27/005* (2013.01); *G11B 27/102* (2013.01); *H04N 21/47217* (2013.01)

(58) Field of Classification Search
CPC ................ G11B 27/005; G11B 27/102; H04N 21/47217; H04N 5/76; H04N 21/2387; H04N 21/4402; H04N 21/64746
See application file for complete search history.

(56) References Cited

U.S. PATENT DOCUMENTS

| 6,282,155 B1 | 8/2001 | Takahashi et al. |
| 2004/0001695 A1* | 1/2004 | Evans .................... H04N 5/783 386/E5.052 |

(Continued)

FOREIGN PATENT DOCUMENTS

| CN | 101554050 A | 10/2009 |
| CN | 102123307 A | 7/2011 |

(Continued)

OTHER PUBLICATIONS

International Search Report Issued in Application PCT/CN2020/084463 dated Jul. 10, 2020, with English Translation, citing references AA-AB and AO-AS therein (7 pages).

(Continued)

*Primary Examiner* — Girumsew Wendmagegn
(74) *Attorney, Agent, or Firm* — ArentFox Schiff LLP

(57) ABSTRACT

In a video processing method, a video reverse playback instruction is received. A total video duration of the video and a played duration of the video are obtained in response to the video reverse playback instruction. The video reverse playback instruction indicates that the video is to be played in reverse order. A first reverse playback time point corresponding to the video is determined according to the total video duration and the played duration. Subdata from video data of the video is determined based on a time range indicated by the first reverse playback time point and a pre-loading time threshold. The subdata corresponds to the time range of the video. The subdata is pre-loaded to obtain pre-loaded video data. Further, a first reverse playback video frame corresponding to the first reverse playback time point is obtained from the pre-loaded video data for playback in the reverse order.

20 Claims, 11 Drawing Sheets

(56) References Cited

U.S. PATENT DOCUMENTS

| | | |
|---|---|---|
| 2013/0227080 A1 | 8/2013 | Gao et al. |
| 2014/0136653 A1 | 5/2014 | Luby et al. |
| 2015/0304714 A1 | 10/2015 | Park et al. |
| 2018/0048921 A1 | 2/2018 | Sood et al. |

FOREIGN PATENT DOCUMENTS

| | | |
|---|---|---|
| CN | 103024446 A | 4/2013 |
| CN | 103369351 A | 10/2013 |
| CN | 103974013 A | 8/2014 |
| CN | 103974013 A | 8/2014 |
| CN | 104144318 A | 11/2014 |
| CN | 104519294 A | 4/2015 |
| CN | 105227884 A | 1/2016 |
| CN | 105338409 A | 2/2016 |
| CN | 105828109 A | 8/2016 |
| CN | 106331718 A | 1/2017 |
| CN | 107071511 A | 8/2017 |
| CN | 107087214 A | 8/2017 |
| CN | 107197382 A | 9/2017 |
| CN | 107222779 A | 9/2017 |
| CN | 107979621 A | 5/2018 |
| CN | 108124202 A | 6/2018 |
| CN | 108174281 A | 6/2018 |
| CN | 109525887 A | 3/2019 |
| GB | 8916068 | 8/1989 |
| JP | H10150636 A | 6/1998 |
| JP | 2000101969 A | 4/2000 |
| JP | 2004040791 A | 2/2004 |
| JP | 2007235547 A | 10/2007 |

OTHER PUBLICATIONS

Written Opinion Issued in Application PCT/CN2020/084463 dated Jul. 10, 2020 (3pages).

Chang-Hong Fu, et al., "Improved macroblock-based reverse play algorithm for MPEG video streaming", 2004 International Conference on Image Processing, ICIP 2004, Apr. 18, 2005, p. 2063-2066.

Chinese Office Action dated Feb. 8, 2022 in Application No. 201910356842.3 with English Translation.

Shaochun Xia, "Research on Stream Scheduling Algorithm for VOD System", China Master's Theses Full-text Database, Apr. 15, 2004, p. 1-92.

Japanese Office Action dated Nov. 29, 2022 in Application No. 2021-560103, with English Translation, 12 pages.

* cited by examiner

VIDEO PROCESSING METHOD AND APPARATUS, TERMINAL, AND STORAGE MEDIUM

RELATED APPLICATIONS

This application is a continuation of International Application No. PCT/CN2020/084463, filed on Apr. 13, 2020 and entitled "VIDEO PROCESSING METHOD AND DEVICE, AND STORAGE MEDIUM," which claims priority to Chinese Patent Application No. 201910356842.3, filed on Apr. 29, 2019 entitled "VIDEO PROCESSING METHOD AND APPARATUS, TERMINAL, AND STORAGE MEDIUM." The entire disclosures of the prior applications are hereby incorporated by reference in their entirety.

FIELD OF THE TECHNOLOGY

This application relates to video processing technologies in the field of electronic application, including video processing.

BACKGROUND OF THE DISCLOSURE

When making a reverse playback video, video editing software needs to recode an original video to generate a new video file. In an application (APP) that provides this video reverse playback function, a user selects a local video, and after the user selects the reverse playback function, the APP needs to decode the entire original video first, store the original video into a new video where frames are displayed in the reverse order, and then play the new video, thereby implementing the video reverse playback function.

SUMMARY

Embodiments of this disclosure include a video processing method and apparatus, a terminal, and a non-transitory computer-readable storage medium. When a video reverse playback function is performed, the occupancy of an internal memory can be reduced, the processing speed can be improved, and the processing time can be reduced.

The technical solutions in the embodiments of this disclosure can be implemented as follows.

According to an aspect, an embodiment of this disclosure provides a video processing method. In the video processing method, a video reverse playback instruction is received. A total video duration of the video and a played duration of the video are obtained in response to the video reverse playback instruction. The video reverse playback instruction indicates that the video is to be played in reverse order. A first reverse playback time point corresponding to the video is determined according to the total video duration and the played duration. Subdata from video data of the video is determined based on a time range indicated by the first reverse playback time point and a pre-loading time threshold. The subdata corresponds to the time range of the video. The subdata is pre-loaded to obtain pre-loaded video data. Further, a first reverse playback video frame corresponding to the first reverse playback time point is obtained from the pre-loaded video data for playback in the reverse order.

According to an aspect, an embodiment of this disclosure further provides a video processing method. In the video processing method, a video is determined in a video editing page. A total video duration of the video and a played duration of the video are obtained when a video reverse playback function is enabled. A first reverse playback time point corresponding to the video is determined according to the total video duration and the played duration. Subdata from video data of the video is determined based on a time range indicated by the first reverse playback time point and a pre-loading time threshold. The subdata corresponds to the time range of the video. The subdata is pre-loaded to obtain pre-loaded video data. Further, a first reverse playback video frame corresponding to the first reverse playback time point is obtained from the pre-loaded video data for playback in reverse order in response to a received video playback instruction.

According to an aspect, an embodiment of this disclosure provides a video processing apparatus, including processing circuitry. The processing circuitry is configured to receive a video reverse playback instruction. The processing circuitry is configured to obtain a total video duration of a video and a played duration of the video in response to the video reverse playback instruction. The video reverse playback instruction indicates that the video is to be played in reverse order. The processing circuitry is configured to determine a first reverse playback time point corresponding to the video according to the total video duration and the played duration. The processing circuitry is configured to determine subdata from video data of the video based on a time range indicated by the first reverse playback time point and a pre-loading time threshold. The subdata corresponds to the time range of the video. The processing circuitry is further configured to pre-load the subdata to obtain pre-loaded video data, and obtain a first reverse playback video frame corresponding to the first reverse playback time point from the pre-loaded video data for playback in the reverse order.

According to an aspect, an embodiment of this disclosure further provides a terminal, including a processor, a communication interface, a memory, and a communication bus. The processor, the communication interface, and the memory communicate with each other by using the communication bus; and the communication interface is an interface of a communication module. The memory is configured to store program code, and transmit the program code to the processor; and the processor being configured to call instructions of program code in the memory to perform the video processing method in the foregoing aspects.

According to an aspect, an embodiment of this disclosure provides non-transitory computer-readable storage medium storing instructions which when executed by at least one processor cause the at least one processor to perform the video processing method in the foregoing aspects.

According to an aspect, an embodiment of this disclosure provides a computer program product including instructions, the computer program product, when run on a computer, causing the computer to perform the video processing method in the foregoing aspects.

The embodiments of this disclosure can have the following beneficial effects:

During a video reverse playback, the video processing apparatus only needs to determine to-be-decoded subdata that falls within the time range in original video data based on a first reverse playback time point and pre-loading time threshold, and decode and pre-load the to-be-decoded subdata. According to this processing manner, only the video data that falls within the time range in the original video data needs to be decoded, which reducing the time occupied by the internal memory. Moreover, pre-loaded video data corresponding to the to-be-decoded subdata has been pre-loaded, and therefore, a reverse playback video frame may be directly obtained and played at the reverse playback time point from the pre-loaded video data, thereby shortening the video playback procedure, improving the processing speed, and reducing the processing time.

DESCRIPTION OF EMBODIMENTS

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art shall fall within the protection scope of this disclosure.

In the following description, the term "some embodiments" describes subsets of all possible embodiments, but it may be understood that "some embodiments" may be the same subset or different subsets of all the possible embodiments, and can be combined with each other without conflict.

Unless otherwise defined, meanings of all technical and scientific terms used in this disclosure are the same as those usually understood by a person skilled in the art to which this disclosure belongs. Terms used in this disclosure are merely intended to describe objectives of the embodiments of this disclosure, but are not intended to limit this disclosure.

Before the embodiments of this disclosure are further described in detail, a description is made on nouns and terms involved in the embodiments of this disclosure, and the nouns and terms involved in the embodiments of this disclosure are applicable to the following explanations.

1) Video reverse playback or video backward playback: It is a process of playing a video in reverse chronological order during video playback.

2) "In response to" is used for representing a condition or status on which one or more operations to be performed depend. When the condition or status is satisfied, the one or more operations may be performed immediately or after a set delay. Unless explicitly stated, there is no limitation on the order in which the plurality of operations is performed.

3) Reverse playback time point: It is a time point representing a time point corresponding to original video data when video frames are played forward, for example, may be a time point displayed in a video frame.

The following describes an exemplary application of a video processing apparatus in an embodiment of this disclosure. The apparatus provided in this embodiment of this disclosure may be implemented as a user terminal with a video playback capability of various types such as a smartphone, a tablet computer, a notebook computer, and the like. An example in which the video processing apparatus is a terminal is described in the following.

Figure 1:
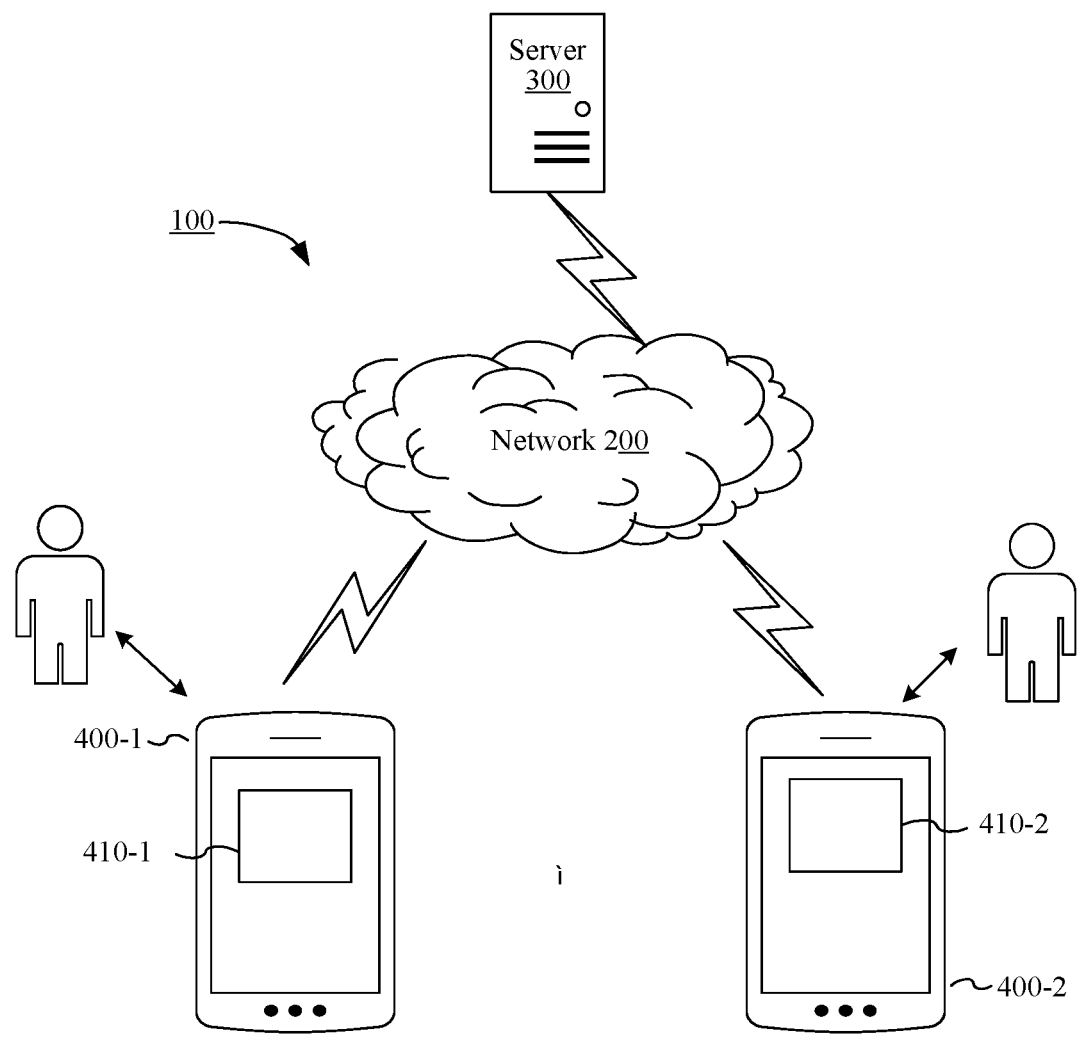
FIG. 1 is a schematic structural diagram of a video processing system architecture according to an embodiment of this disclosure.

FIG. 1 is a schematic architectural diagram of a video processing system 100 according to an embodiment of this disclosure. To support an exemplary application, a terminal (e.g., a terminal 400-1 and a terminal 400-2) is connected to a server 300 by using a network 200. The network 200 may be a wide area network, a local area network, or a combination of thereof. Data transmission is implemented by using a radio link.

The terminal is configured to receive a video reverse playback instruction in a video playback interface displayed in a graphical interface (e.g., a graphical interface 410-1 and a graphical interface 410-2), and obtain a total video duration and a played duration corresponding to original video data in response to the video reverse playback instruction, the video reverse playback instruction being used for indicating the original video data to be played in reverse order; determine a first reverse playback time point corresponding to the original video data according to the total video duration and the played duration; determine to-be-decoded subdata from the original video data based on a time range identified by the first reverse playback time point and a pre-loading time threshold, the to-be-decoded subdata being video data that falls within the time range in the original video data; decode and pre-load the to-be-decoded subdata to obtain pre-loaded video data; and obtain a reverse playback video frame corresponding to the first reverse playback time point from the pre-loaded video data for playback. The server 300 is configured to provide original video data for a terminal.

The video processing apparatus provided in this embodiment of this disclosure may be implemented in a manner of hardware (e.g., processing circuitry) or a combination of hardware and software. The following describes various exemplary implementations of the video processing apparatus provided in this embodiment of this disclosure.

Figure 2:
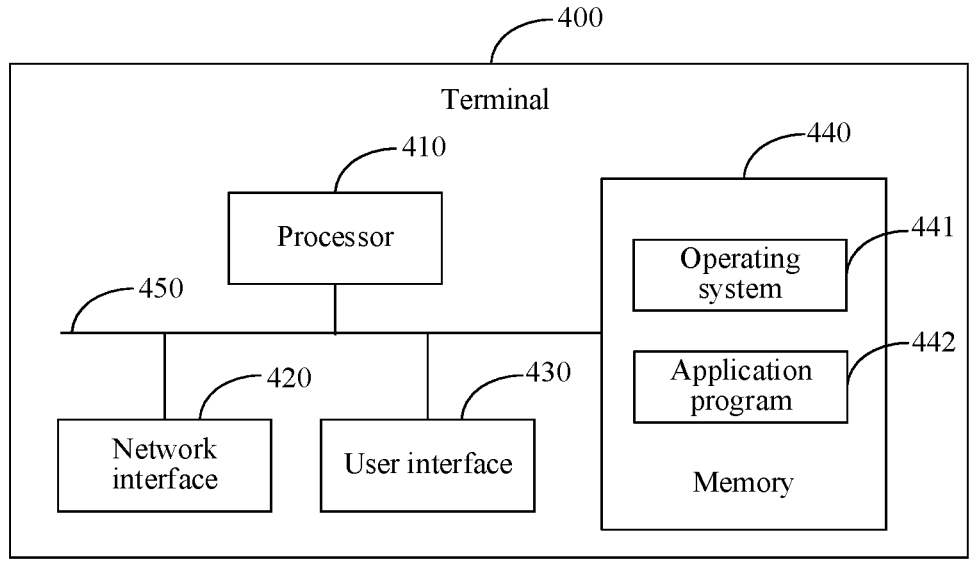
FIG. 2 is a schematic structural diagram of a terminal according to an embodiment of this disclosure.

FIG. 2 is a schematic structural diagram of a terminal 400 according to an embodiment of this disclosure. The terminal 400 may be a terminal with a video playback capability such as a mobile phone, a computer, a digital broadcasting terminal, an information receiving and receiving device, a game console, a tablet device, a medical device, a fitness facility, or a personal digital assistant. The described structure is not to be considered restrictive, for example, a part of components described in the following may be omitted, alternatively, components not recorded in the following may be added to adapt to special requirements of some applications.

The terminal 400 shown in FIG. 2 includes at least one processor 410, a memory 440, at least one network interface 420, and a user interface 430. All the components in the terminal 400 are coupled together by a bus system 450. It may be understood that the bus system 450 is configured to implement connection and communication between the components. In addition to a data bus, the bus system 450 further includes a power bus, a control bus, and a status signal bus. However, for ease of clear description, all types of buses are marked as the bus system 450 in FIG. 2.

The user interface 430 may include a display, a keyboard, a mouse, a trackball, a click wheel, a key, a button, a touchpad, a touch screen, or the like.

The memory 440 may be a volatile memory or a non-volatile memory, or may include a volatile memory and a non-volatile memory. The non-volatile memory may be a read-only memory (ROM). The volatile memory may be a random access memory (RAM). The memory 440 described in this embodiment of this disclosure is to include any other suitable type of memories.

The memory 440 in this embodiment of this disclosure can store data to support operation of the terminal 400. An example of the data includes any computer program to be operated on the terminal 400, for example, an operating system 441 and an application program 442. The operating system 441 includes various system programs, for example, a framework layer, a core library layer, a driver layer, and the like, which are used for implementing various basic services and processing a task based on hardware. The application program 442 may include various application programs, for example, video processing instructions.

For example, the video processing method provided in this embodiment of this disclosure is implemented by a combination of software and hardware. The video processing method provided in this embodiment of this disclosure may be directly embodied as a combination of software modules executed by processing circuitry such as the processor 410. The software module may be located in a storage medium such as a non-transitory computer-readable storage medium, the storage medium is located in the memory 440, and the processor 410 reads executable video processing instructions included in the software module in the memory 440, and implements, in combination with necessary hardware (e.g. including a processor 410 and another component connected to the bus 450), the video processing method provided in the embodiments of this disclosure.

For example, the processor 410 may be an integrated circuit chip, and has a signal processing capability, for example, a general-purpose processor, a digital signal processor (DSP), or another programmable logical device, a discrete gate or a transistor logical device, or a discrete hardware component. The general-purpose processor may be a microprocessor, any conventional processor, or the like.

For example, a terminal provided in an embodiment of this disclosure includes a processor, a communication interface, a memory, and a communication bus. The processor, the communication interface, and the memory communicate with each other by using the communication bus. The communication interface is an interface of a communication module. The memory is configured to store program code, and transmit the program code to the processor. The processor is configured to call instructions of program code in the memory to perform the video processing method according to this embodiment of this disclosure.

In addition, in an example in which the video processing method provided in this embodiment of this disclosure is implemented by hardware, the video processing method provided in this embodiment of this disclosure may be directly executed by using the processor 410 in the form of a hardware decoding processor, for example, one or more application specific integrated circuits (ASICs), DSPs, programmable logic devices (PLDs), complex programmable logic devices (CPLDs), field-programmable gate arrays (FPGAs), or other electronic elements, to execute the video processing method provided in this embodiment of this disclosure.

In combination with the exemplary applications and implementations of the video processing apparatus according to this embodiment of this disclosure, an example in which the video processing apparatus is a terminal is used for describing the video processing method according to this embodiment of this disclosure.

Figure 3:
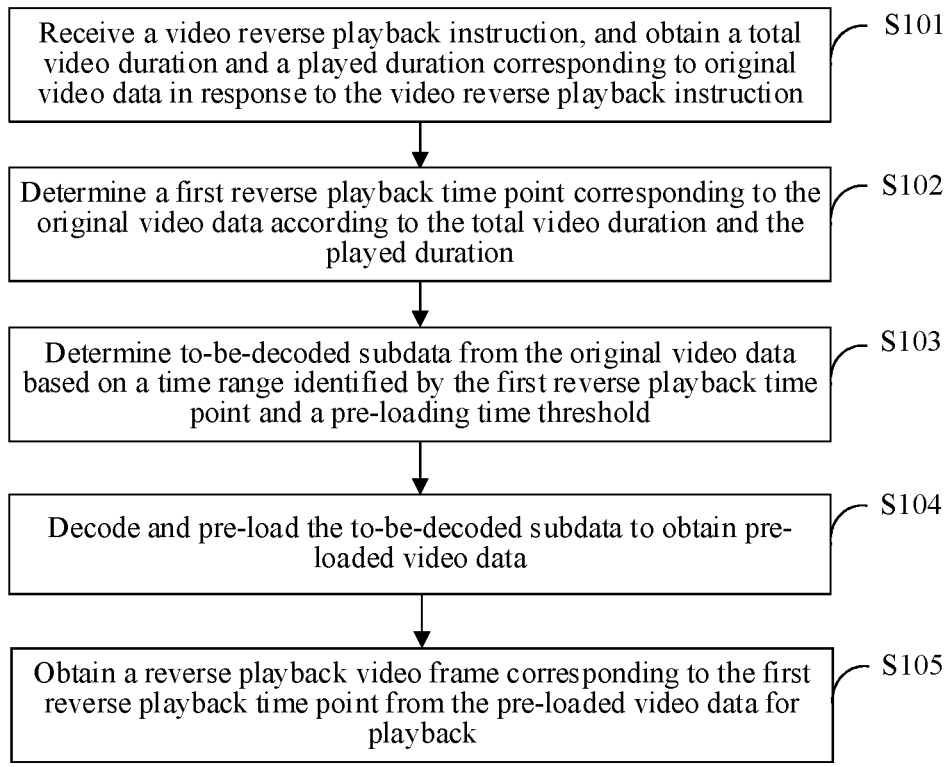
FIG. 3 is a flowchart of a video processing method according to an embodiment of this disclosure.

FIG. 3 is a schematic flowchart of a video processing method according to an embodiment of this disclosure, and steps shown in FIG. 3 are combined for description.

In step S101, a video reverse playback instruction is received, and a total video duration and a played duration corresponding to original video data is obtained in response to the video reverse playback instruction. The video reverse playback instruction is used for indicating the original video data to be played in reverse order.

In step S102, a first reverse playback time point corresponding to the original video data is determined according to the total video duration and the played duration.

In step S103, to-be-decoded subdata from the original video data is determined based on a time range identified by the first reverse playback time point and a pre-loading time threshold. The to-be-decoded subdata is video data that falls within the time range in the original video data.

In step S104, the to-be-decoded subdata is decoded and pre-loaded to obtain pre-loaded video data.

In step S105, a reverse playback video frame corresponding to the first reverse playback time point is obtained from the pre-loaded video data for playback.

In this embodiment of this disclosure, when the terminal is adopted for a video playback, a video reverse playback function may be implemented. The video reverse playback function is used for playing to-be-played video data in reverse order, thereby playing to-be-played video data in reverse order. The to-be-played video data in this embodiment of this disclosure is original video data. The original video data may be obtained by using a locally-stored multi-media information library, or may be obtained by using a multi-media information server by using a network, or may be transmitted from another terminal or device by using a network. This is not limited in this embodiment of this disclosure.

The original video data may include a plurality of video frames, for example, a video frame sequence. When the terminal performs a reverse playback function on the original video data, the video frames are played one by one backwards starting from the last frame of the video frame sequence, for example, until the entire original video data is played.

In step S101, the terminal is installed with a video APP, and the video APP is configured to play a video. In the video APP, a reverse playback function may be implemented by setting a reverse playback function control or key. When the reverse playback function control or key in the terminal is triggered, the terminal receives a video reverse playback instruction. The video reverse playback instruction is used for indicating the original video data to be played in reverse order, for example, the video reverse playback instruction carries identifier information of the original video data, and the like. In this case, in response to the video reverse playback instruction, the terminal may obtain the original video data based on the identifier information of the original video data from the local or a server side. In addition, when the original video data is obtained, the terminal may further obtain a total video duration and a played duration corresponding to the original video data. The played duration is an initial time corresponding to a player when the reverse playback function control is triggered. If the entire original video data is to be played, the played duration is 0. If the reverse playback function control is triggered when a user drags the player's progress bar to a specific location, a time corresponding to the specific location on the player is a non-0 time, and the played duration is a duration played from an initial location of the progress bar to the specific location.

The played duration is obtained when the reverse playback function is triggered.

For example, a preset reverse playback function key or a preset reverse playback function control is displayed in a video playback interface of the terminal in this embodiment of this disclosure, and the user triggers a video reverse playback instruction by triggering the preset reverse playback function key or the preset reverse playback function control. For example, when the user taps or slides an icon representing a preset reverse playback function control, a video reverse playback instruction is triggered and generated, that is, a video reverse playback instruction is received.

The video reverse playback instruction in this embodiment of this disclosure plays a role of playing the original video data in reverse order. When the user taps or slides an icon representing a preset reverse playback function control, a video reverse playback instruction is triggered and generated, that is, a video reverse playback instruction is received. The video reverse playback instruction directly indicates to play the original video data in reverse order. A reverse playback video frame is obtained by using video information processing in this embodiment of this disclosure, and the reverse playback video frame is played.

However, according to this embodiment of this disclosure, the reverse playback function may alternatively be triggered and enabled by using the video reverse playback instruction. After the user taps the playback control again, the reverse playback video starts to be played. This is not limited in this embodiment of this disclosure.

An example in which the video reverse playback instruction directly indicates to obtain and play a reverse playback video frame is used for description.

Further, in a process that the terminal plays a video reversely, the video is played in reverse order, for example by using a player. Although the video is played in reverse chronological order based on the original video data, a playback time of the player still starts from 0 and ends after the total video duration. That is, a playback time of the player is in positive order, and an initial playback time of the player corresponds to the last frame of the original video data.

In step S102, the terminal already knows the total video duration and the played duration of the original video data, and then, the terminal may know a reverse playback time point corresponding to the original video data by subtracting the played duration from the total video duration.

In this embodiment of this disclosure, the reverse playback time point may be a time point corresponding to a video frame in the original video data, not a playback time point of the player.

In this embodiment of this disclosure, the original video data has a playback time of positive order corresponding to the video frame, and the reverse playback time point is a corresponding time point in the playback time of positive order.

For example, assuming that the total video duration of the original video data is 5 s, and the played duration is 1 s. Then, the obtained reverse playback time point is 5 s−1 s=4 s. That is, the player has played for 1 s, and a video frame at 4 s in the original video data needs to start to be played.

In step S103, the terminal knows a reverse playback time point corresponding to the original video data, and then the terminal may play the original video data from the reverse playback time point in a reverse playback temporal direction, thereby implementing the reverse playback. That is, a section of video frame data from a video frame of the original video data corresponding to the reverse playback time point to an initial video frame of the original video data is the video data to be played in reverse order.

In this embodiment of this disclosure, a pre-loading time threshold is set by the terminal in advance during an implementation of the video reverse playback. The pre-loading time threshold is a time value set for the purpose of pre-loading video data that has not been played near the reverse playback time point. The terminal may obtain a lower limit time value by subtracting the pre-loading time threshold from a value of the reverse playback time point, and may identify a time range based on the lower limit time value and the reverse playback time point, and then obtain video data within the time range from original time data based on the time range as to-be-decoded subdata. The to-be-decoded subdata is to-be-played video data in an upcoming time, is video data belonging to a small time range of the original video data, or is video data belonging to a small part of the original video data, but also includes to-be-played video data when starting to play in reverse order from the reverse playback time point. The to-be-decoded subdata is video data that falls within the time range in the original video data.

The pre-loading time threshold in this embodiment of this disclosure is a time length with a relatively small value, for example, 0.5 s, and the pre-loading time threshold may be less than a reverse playback time length that can be covered by the reverse playback time point.

Because the pre-loading time threshold is relatively smaller than a playback duration of the original video data, decoding processing may be performed on video data with a pre-loading time threshold length. In this case, the processing speed is very rapid, and the processing time is reduced, thereby implementing rapid data processing on the video data in a process of playing video data in reverse order.

In step S104, in this embodiment of this disclosure, in a process that the video data is transmitted by using a network, in order to implement a rapid transmission, the video data is compressed into original video data. Therefore, the original video data can be played in positive order or in reverse order after the original video data is decoded. In this embodiment of this disclosure, H264 and H265 formats may be adopted to perform an intra-frame compression and an inter-frame compression on video frames in video data. The intra-frame compression is to compress a single video frame. The inter-frame compression is to perform a redundant computation on a group of consecutive video frames, and only different parts of different frames are retained, thereby reducing a data amount.

Based on this, after obtaining the to-be-decoded subdata, the terminal also needs to decode the to-be-decoded subdata to play the video. In addition, in this embodiment of this disclosure, the terminal decodes to-be-decoded subdata in the foregoing time interval in one time and pre-loads the video data. Therefore, when the video data is played from the first reverse playback time point backward (in a temporal direction of a forward playback), corresponding video frames may be obtained from the pre-loaded video data directly, to implement a real-time reverse playback function.

In some embodiments of this disclosure, the terminal first decodes the to-be-decoded subdata to obtain decoded original video subdata; and then pre-loads the decoded original video subdata by using an asynchronous thread to obtain pre-loaded video data.

In this embodiment of this disclosure, the terminal pre-loads the decoded original video subdata by using the asynchronous thread, so as to obtain the pre-loaded video data. The asynchronous thread manner enables the processing to be performed at the same time, thereby improving the processing efficiency. In this embodiment of this disclosure, the pre-loading process is a process of storing in a buffer, and this is not limited in this embodiment of this disclosure.

For the decoding process, video data of some video frames in the original video data is obtained by compressing previous video frames during a forward playback, and therefore, the previous video frames need to be decoded first, and then next video frames are decoded according to the decoded previous video frames.

Figure 4:
FIG. 4 is a schematic diagram of an exemplary frame encoding manner of original video data according to an embodiment of this disclosure.

For example, an encoding manner (e.g., a compression manner) of the video data is mainly a non-full I frame encoding manner, and in video data of the non-full I frame encoding manner, video frames include I-frames and P-frames. In the inter-frame encoding manner shown in FIG. 4, that is, the I-frame occurs periodically, and each period is a piece of group of pictures (GOP) stream data, for example, I1, P2, P3, P4 . . . Pn in FIG. 4 is a piece of GOP stream data. The I-frame is referred to as an intra-frame encoded frame, and the intra-frame encoded frame is an independent frame with all information and can be decoded independently without reference to other frames. The P-frame is also referred to as an inter-frame prediction encoded frame, and the P-frame cannot be decoded independently, and needs to be decoded with reference to the previous I-frame or P-frame.

During video playback, the terminal needs to decode an I-frame first, then relies on a P-frame of the I-frame, and therefore, the terminal may decode correctly and implement the playback. Otherwise, a problem of blurred screen may occur or the video cannot be played. During a video reverse playback, a P-frame cannot be independently decoded for playback and only can be decoded with the help of an I-frame, and during a reverse playback of the original video data, an I-frame is always located after a P-frame that relies on the I-frame. Therefore, I-frames need to be found for P-frames, and the video may be decoded for playback after the I-frames that the P-frames rely on are found. For the to-be-decoded subdata, existences of the I-frames are detected and obtained successively in reverse chronological order. If there are I-frames, the decoding is performed on each I-frame successively, and all video frames from the each I-frame to an adjacent I-frame or from the each I-frame to the end of the to-be-decoded subdata in the to-be-decoded subdata are decoded and stored into a buffer region (e.g., the pre-loading process) as the pre-loaded video data.

In this embodiment of this disclosure, if the I-frames are not detected, the decoding processing is not performed. The decoding processing may be performed by concatenating a next piece of to-be-decoded original subdata during a next video data decoding.

In step S105, the terminal has pre-loaded pre-loaded video data of a pre-loading time threshold length, and the pre-loaded video data is decoded video data. In this case, the terminal may obtain a reverse playback video frame corresponding to the first reverse playback time point from the pre-loaded video data and play the reverse playback video frame.

In this embodiment of this disclosure, for the pre-loaded video data, the terminal reads reverse playback video frames corresponding to reverse playback time points in reverse chronological order, that is, in reverse order.

For example, in this embodiment of this disclosure, a reverse playback time point is 4 s, and a pre-loading time threshold is 0.5 s. The terminal determines video data corresponding to 4 s–3.5 s (4–0.5=3.5) in the original video data as an object to be decoded and loaded this time, that is, to-be-decoded subdata. Further, the terminal performs a decoding operation on the video data corresponding to the 4 s–3.5 s to obtain decoded original video subdata corresponding to the 4 s–3.5 s, and stores the decoded original video subdata into the buffer as pre-loaded video data corresponding to the 4 s–3.5 s. In this case, the terminal may find a reverse playback video frame corresponding to a first reverse playback time point at 4 s from the pre-loaded video data, and play the video frame.

Further, in this embodiment of this disclosure, after a current reverse playback video frame is played, the terminal starts to obtain and play a next reverse playback video frame, and continues performing the video processing method according to this embodiment of this disclosure until the entire original video data is played or a playback stop instruction is received.

It may be understood that, during a video reverse playback, the terminal only needs to determine to-be-decoded subdata based on the first reverse playback time point and the pre-loading time threshold, and decode and pre-load the to-be-decoded subdata. By decoding original video data within a specific range by using this processing manner, the time of internal memory occupation can be reduced, and pre-loaded video data within a specific range (e.g., a time range identified by the first reverse playback time point and the pre-loading time threshold) can be pre-loaded. In this case, a reverse playback video frame may be directly obtained and played at the reverse playback time point from the pre-loaded video data, thereby shortening the video playback procedure, improving the processing speed, and achieving an effect of reducing the processing time.

Figure 5:
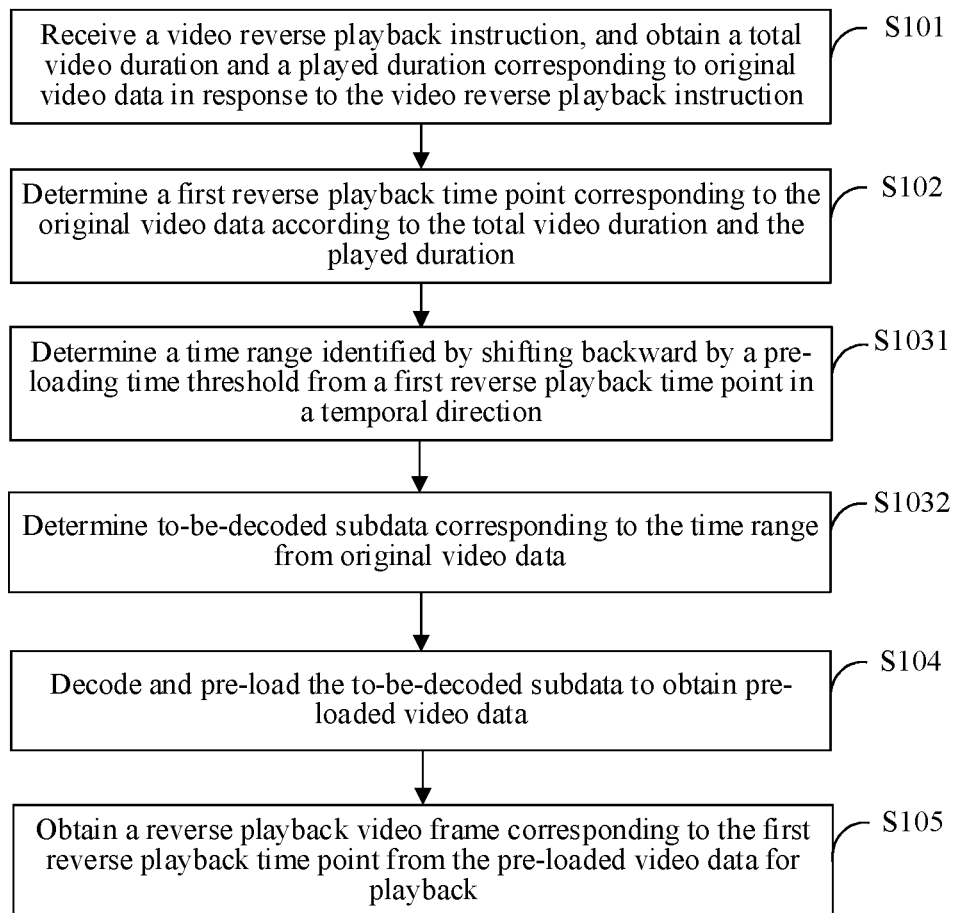
FIG. 5 is a flowchart of a video processing method according to an embodiment of this disclosure.

FIG. 5 is an exemplary schematic flowchart of a video processing method according to an embodiment of this disclosure. Based on FIG. 3, S103 may be implemented by using S1031 and S1032, and steps are combined for description.

In step S1031, a time range identified by shifting backward by a pre-loading time threshold from a first reverse playback time point in a temporal direction is determined.

In step S1032, to-be-decoded subdata corresponding to the time range is determined from original video data.

In this embodiment of this disclosure, a pre-loading time threshold is set by the terminal in advance during an implementation of the video reverse playback. The pre-loading time threshold is a time value set for the purpose of pre-loading video data that has not been played near the reverse playback time point.

The terminal determines a time range identified by shifting backward by a pre-loading time threshold from a first reverse playback time point, and then determines to-be-decoded subdata corresponding to the time range from original video data.

That is, the terminal obtains a lower limit time value by subtracting the pre-loading time threshold from a value of the first reverse playback time point, and determines a time range based on the lower limit time value and the first reverse playback time point, and then obtains video data within the time range from original time data based on the time range as to-be-decoded subdata. The to-be-decoded subdata is to-be-played video data in an upcoming time, and is video data belonging to a small range or a small part of the original video data, but also includes video data to be played at an advanced time point.

Figure 6:
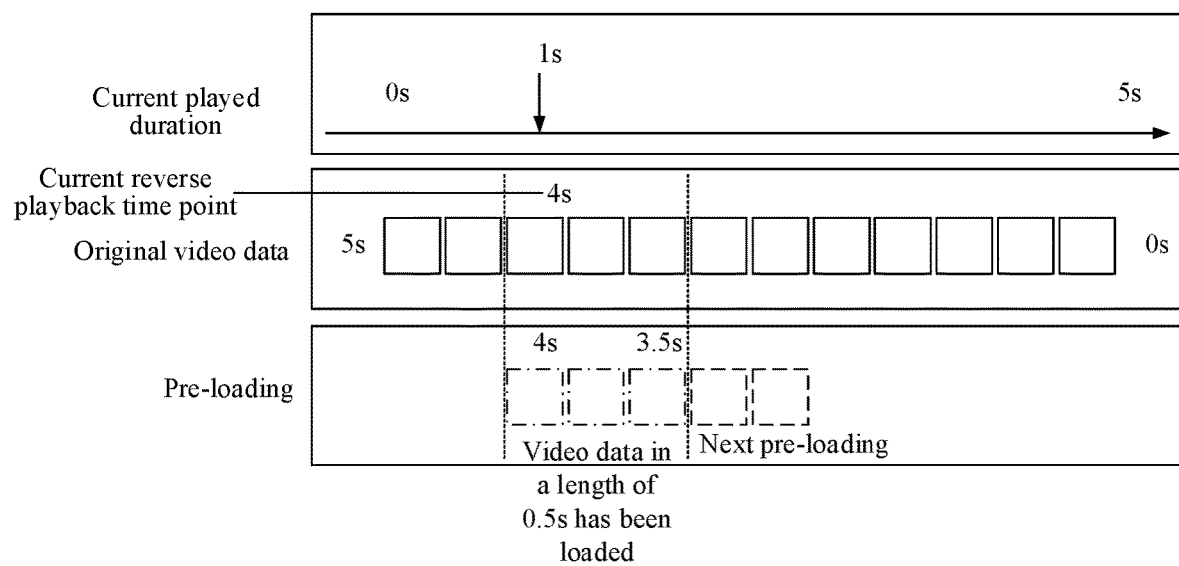
FIG. 6 is a schematic diagram of exemplary video data processing according to an embodiment of this disclosure.

For example, in this embodiment of this disclosure, as shown in FIG. 6, assuming that a total video duration of the original video data is 5 s, and a played duration is 1 s, and then an obtained first reverse playback time point is 5 s−1 s=4 s. That is, the player has played for 1 s, and a video frame at 4 s in the original video data needs to start to be played. The first reverse playback time point is 4 s, and the pre-loading time threshold is 0.5 s. The terminal determines video data in a length of 0.5 s corresponding to 4 s−3.5 s (4−0.5=3.5) in the original video data as an object to be decoded and loaded this time, that is, to-be-decoded subdata.

It may be understood that, the pre-loading time threshold is generally a relatively small value, and the terminal may decode to-be-decoded subdata that satisfies a time length of the pre-loading time threshold. In this case, the processing speed is very rapid, and the processing time may further be reduced, thereby rapidly playing video data.

Figure 7:
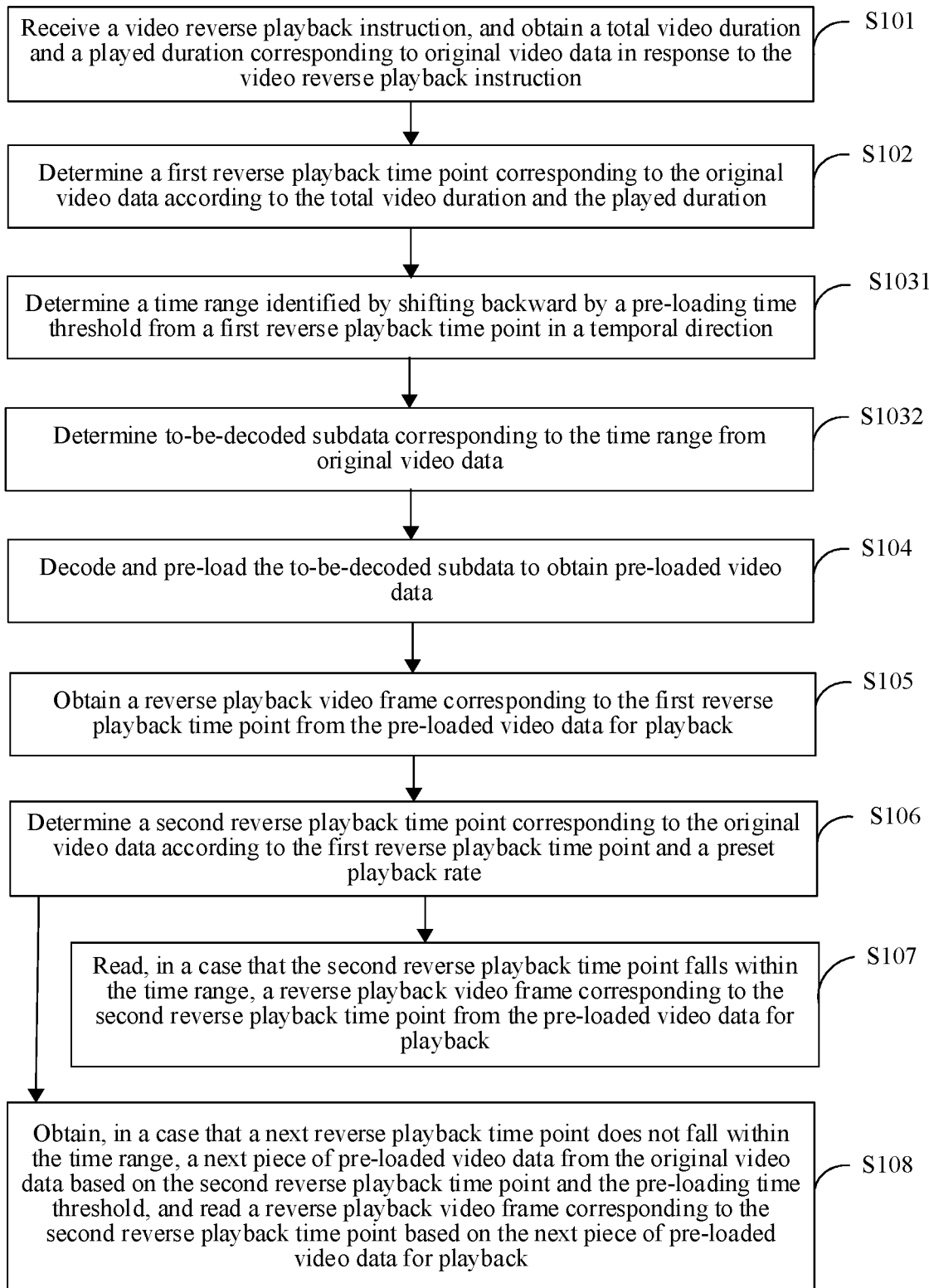
FIG. 7 is a flowchart of a video processing method according to an embodiment of this disclosure.

In some embodiments, FIG. 7 is an exemplary schematic flowchart of a video processing method according to an embodiment of this disclosure. Based on FIG. 5, steps S106 to S108 are further included after step S105, and steps are combined for description.

In step S106, a second reverse playback time point corresponding to the original video data is determined according to the first reverse playback time point and a preset playback rate.

In this embodiment of this disclosure, after a reverse playback video frame is played, the terminal needs to play a next reverse playback video frame immediately, because the reverse playback function can only be implemented by consecutively playing reverse playback video frames. The second reverse playback time point is a time point before the first reverse playback time point in the temporal direction.

In this embodiment of this disclosure, the terminal plays reverse playback video frames by using a player, and the player has a specific playback speed. After the reverse playback video frames are played, a next reverse playback time point is determined by a preset playback rate of the player. That is, the terminal needs to determine a next reverse playback time point corresponding to the original video data according to the reverse playback time point and the preset playback rate.

In this embodiment of this disclosure, the terminal may know a time interval between two adjacent video frames played by the player by using the preset playback rate, and in this case, a time point by shifting backward by the time interval from the first reverse playback time point is the next reverse playback time point.

For example, after the terminal plays a reverse playback video frame at 4 s, assuming that the terminal obtains a time interval of 0.3 s based on the preset playback rate, the terminal calculates that a second reverse playback time point is 3.7 s by using 4−0.3=3.7 (s).

In this embodiment of this disclosure, after the terminal obtains the second reverse playback time point, because the pre-loaded video data has been pre-loaded previously, the terminal may first determine whether a next reverse playback video frame corresponding to the second reverse playback time point has been pre-loaded, and then perform different processing based on a determining result.

In step S107, when the second reverse playback time point falls within the time range, a reverse playback video frame corresponding to the second reverse playback time point is read from the pre-loaded video data for playback.

In step S108, when a next reverse playback time point does not fall within the time range, a next piece of pre-loaded video data is obtained from the original video data based on the second reverse playback time point and the pre-loading time threshold, and a reverse playback video frame corresponding to the second reverse playback time point is red based on the next piece of pre-loaded video data for playback.

In this embodiment of this disclosure, the terminal obtains a determining result after determining whether the reverse playback video frame corresponding to the second reverse playback time point has been pre-loaded. There may be two types of determining results, and one is that the reverse playback video frame has been pre-loaded, the other is that the reverse playback video frame has not been pre-loaded. When the reverse playback time point falls within the time range, it indicates that the reverse playback video frame has been pre-loaded. When the reverse playback time point does not fall within the time range, it indicates that the reverse playback video frame has not been pre-loaded.

Then, when the reverse playback video frame corresponding to the second reverse playback time point has been pre-loaded, that is, when the second reverse playback time point falls within the time range, the terminal may directly read the reverse playback video frame corresponding to the second reverse playback time point from the pre-loaded video data, and implement a real-time video data reverse playback function by playing the reverse playback video frame.

When the reverse playback video frame corresponding to the second reverse playback time point has not been pre-loaded, that is, when the second reverse playback time point does not fall within the time range, the reverse playback video frame corresponding to the second reverse playback time point needs to be reloaded.

The terminal may determine a next time range based on the second reverse playback time point and the pre-loading time threshold, and then, obtain to-be-decoded subdata corresponding to the next time range from the original video data, and obtain a next piece of pre-loaded video data by decoding and pre-loading the to-be-decoded subdata, and finally obtain, based on the next piece of pre-loaded video data, a reverse playback video frame corresponding to the second reverse playback time point for playback, thereby implementing a processing procedure for the reverse playback video frame corresponding to the second reverse playback time point.

In this embodiment of this disclosure, a specific time principle of a pre-loading procedure performed by the terminal on the reverse playback video frame corresponding to the second reverse playback time point may be consistent with that of steps S103 to S105, and detailed implementations are may also be consistent in principle. After the reverse playback video frame is processed, a processing procedure for a reverse playback video frame corresponding to a third reverse playback time point (the third reverse playback time point is a time point before the second reverse playback time point in the temporal direction) is performed. A principle of the processing procedure for the reverse playback video frame is consistent with a principle of the processing procedure for the reverse playback video frame corresponding to the second reverse playback time point, and the foregoing steps are sequentially repeated to implement the reverse playback of the entire original video data.

For example, the first reverse playback time point is 4 s, and the pre-loading time threshold is 0.5 s, and then a time range determined by the terminal is 4 s–3.5 s (4–0.5=3.5). After the terminal plays a reverse playback video frame at 4 s, assuming that the terminal obtains a time interval of 0.3 s based on the preset playback rate, the terminal calculates that a second reverse playback time point is 3.7 s by using 4–0.3=3.7 (s). 3.7 s falls within the range of 4 s–3.5 s, and therefore, the terminal may directly read the stored reverse playback video frame corresponding to the second reverse playback time point from the pre-loaded video data, and play the reverse playback video frame in real time.

In another possible situation of the example, after the terminal plays a reverse playback video frame at 4 s, assuming that the terminal obtains a time interval of 0.6 s based on the preset playback rate, the terminal calculates that a second reverse playback time point is 3.4 s by using 4–0.6=3.4 (s). However, 3.4 s does not fall within the range of 4 s–3.5 s, and therefore, the terminal determines that a next time range is [3.4 s–2.9 s]. 2.9 s is obtained by subtracting 0.5 s from 3.4 s, and then the terminal determines video data corresponding to 3.4 s–2.9 s in the original video data as an object to be decoded and loaded this time, that is, a next piece of to-be-decoded subdata, and then decodes the next piece of to-be-decoded subdata, and obtains a next piece of decoded original video subdata through pre-loading, and finally obtains a reverse playback video frame corresponding to the second reverse playback time point from the next piece of decoded original video subdata, and plays the reverse playback video frame. The foregoing procedures are sequentially repeated, and a next reverse playback video frame is obtained and played, until the entire original video data is played.

It may be understood that, when the terminal obtains and plays a reverse playback video frame, when the second reverse playback time point falls within the time range, which indicates that a reverse playback video frame corresponding to the reverse playback time point has been loaded, the terminal may directly obtain and play the reverse playback video frame, thereby playing the reverse playback video frame in real time and improving the reverse playback processing speed. However, when the second reverse playback time point does not fall within the time range, the terminal may alternatively obtain a new reverse playback video frame within a specific time range, and pre-load and play the reverse playback video frame. The time range is a small range of time values, and therefore, each procedure that the terminal decodes and pre-loads is very rapid and an occupied internal memory is small. In this case, not only the video processing speed can be improved, but also usage space of the internal memory can be reduced.

Steps S107 and S108 in this embodiment of this disclosure are two exemplary implementations, and after step S106 is performed, the terminal may perform step S107 or perform step S108. An actual execution sequence is determined according to an actual condition determining result, and is not limited in this embodiment of this disclosure.

Figure 8:
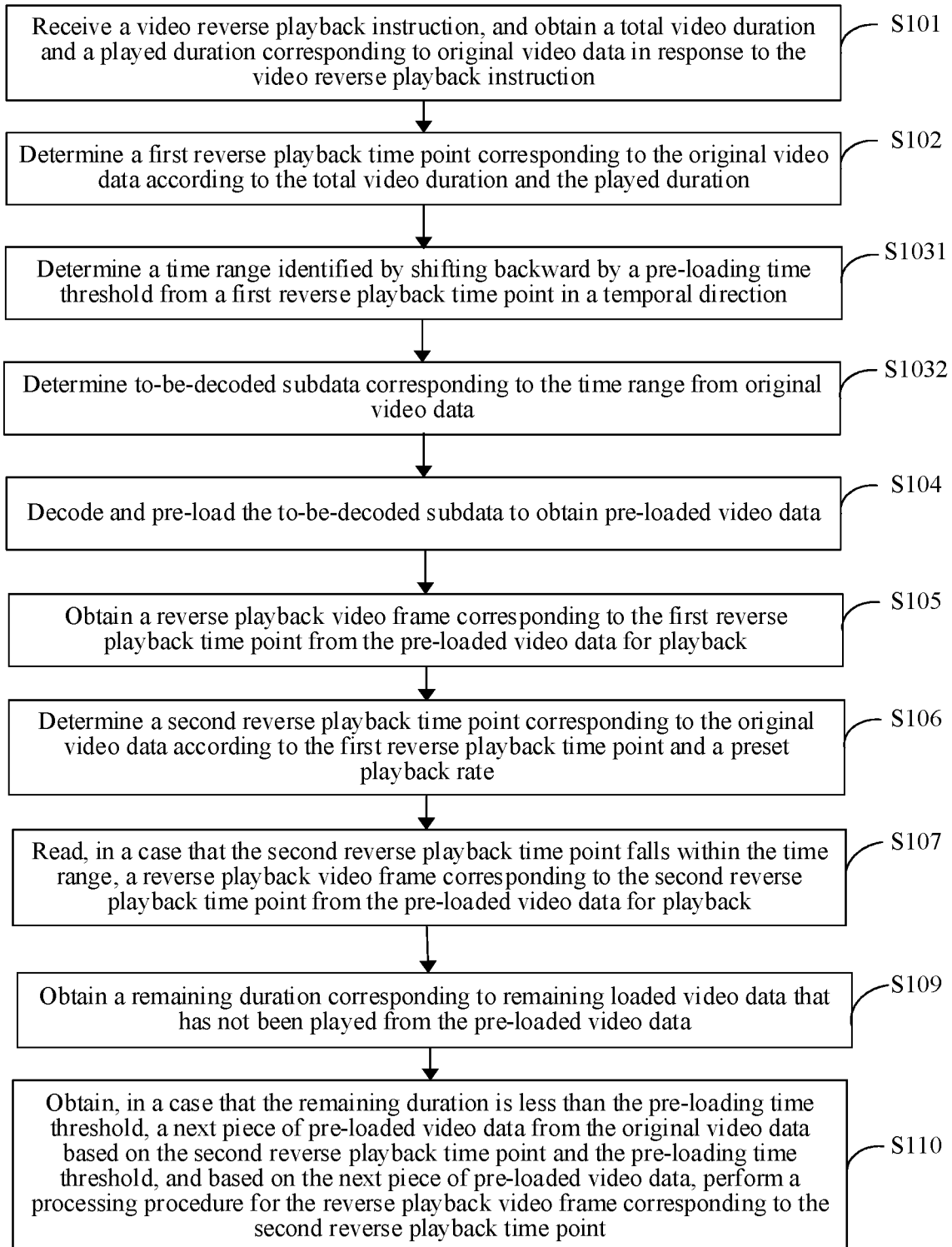
FIG. 8 is a flowchart of a video processing method according to an embodiment of this disclosure.

FIG. 8 is an exemplary schematic flowchart of a video processing method according to an embodiment of this application. Based on FIG. 7, steps S109 and S110 are further included after step S107, and steps are combined for description.

In step S109, a remaining duration corresponding to remaining loaded video data that has not been played from the pre-loaded video data is obtained.

In this embodiment of this disclosure, the terminal has pre-loaded pre-loaded video data, and has already started to read a reverse playback video frame from the pre-loaded video data. In this case, there are pieces of remaining loaded video data that have not been played in the pre-loaded video data. Durations of these pieces of remaining loaded video data are obtained, that is, a video duration corresponding to these pieces of remaining loaded video data is referred to as a remaining duration.

In this embodiment of this disclosure, the remaining loaded video data that has not been played is referred to as corresponding loaded video data within a range from a reverse playback time point that has been played in an upcoming time to [a reverse playback time point-a pre-loading time threshold].

For example, the reverse playback time point is 4 s, and the pre-loading time threshold is 0.5 s, and then a time range determined by the terminal is 4 s–3.5 s (4–0.5=3.5). After the terminal has played the reverse playback video frame at 4 s, assuming that a next reverse playback time point is 3.7 s. 3.7 s falls within the range of 4 s–3.5 s, and the terminal may directly read a stored next reverse playback video frame from the pre-loaded video data, and play the reverse playback video frame in real time, and then, a remaining duration obtained by the terminal is 3.7 s–3.5 s=0.2 s.

In step S110, when the remaining duration is less than the pre-loading time threshold, a next piece of pre-loaded video data is obtained from the original video data based on the second reverse playback time point and the pre-loading time threshold, and based on the next piece of pre-loaded video data, a processing procedure is performed for the reverse playback video frame corresponding to the second reverse playback time point.

In this embodiment of this disclosure, after the terminal obtains the remaining duration, the terminal may load, when the remaining duration is less than the pre-loading time threshold, a next piece of pre-loaded video data in addition to the pre-loaded video data based on the continuity and flow of the video reverse playback, so as to ensure a fluent playback. Therefore, when the remaining duration is less than the pre-loading time threshold, the next piece of pre-loaded video data is obtained from the original video data according to the foregoing implementation principle and based on the second reverse playback time point and the pre-loading time threshold. In this case, the loaded video data is the remaining loaded video data and the next piece of pre-loaded video data, and the terminal may continue to obtain and play a reverse playback video frame corresponding to a second reverse playback time point from the remaining loaded video data and the next pre-loaded video data. The procedures are sequentially performed, until the entire original video data has been played in reverse order.

In some embodiments of this disclosure, after each reverse playback video frame is played, the terminal may perform a determination on a remaining duration, to determine whether there is a need to pre-load or supplement some pieces of pre-loaded video data. This is not limited in this embodiment of this disclosure.

In some embodiments of this disclosure, when the remaining duration is greater than or equal to the pre-loading time threshold, the terminal still directly reads corresponding reverse playback video frames from the pre-loaded video data for playback in a next reverse playback process.

For example, as shown in FIG. 6, assuming that a total video duration of the original video data is 5 s, and a played duration is 1 s, and then an obtained reverse playback time point is 5 s−1 s=4 s. That is, the player has played the video for 1 s, and a video frame at 4 s in the original video data needs to start to be played. The reverse playback time point is 4 s, and the pre-loading time threshold is 0.5 s. Assuming that the terminal has loaded video data in a length of 0.5 s that has been loaded corresponding to 4 s−3.5 s (4−0.5=3.5) in the original video data, and after the terminal plays the reverse playback video frame at 4 s, assuming that a next reverse playback time point is 3.7 s. 3.7 s falls within the range of 4 s−3.5 s, and the terminal may directly read a stored next reverse playback video frame from the pre-loaded video data, and play the reverse playback video frame in real time, and then, a remaining duration obtained by the terminal is 3.7 s−3.5 s=0.2 s. Because 0.2 s is less than 0.5 s, the terminal needs to perform a next pre-loading process, to supplement available pre-loaded video data.

It may be understood that, the terminal may supplement pre-loaded video data of a pre-loading time threshold length when a data amount of the pre-loaded video data is relatively small, and therefore, the sufficiency of reverse playback video frames can be ensured and the flow of reverse playback can be improved.

Figure 9:
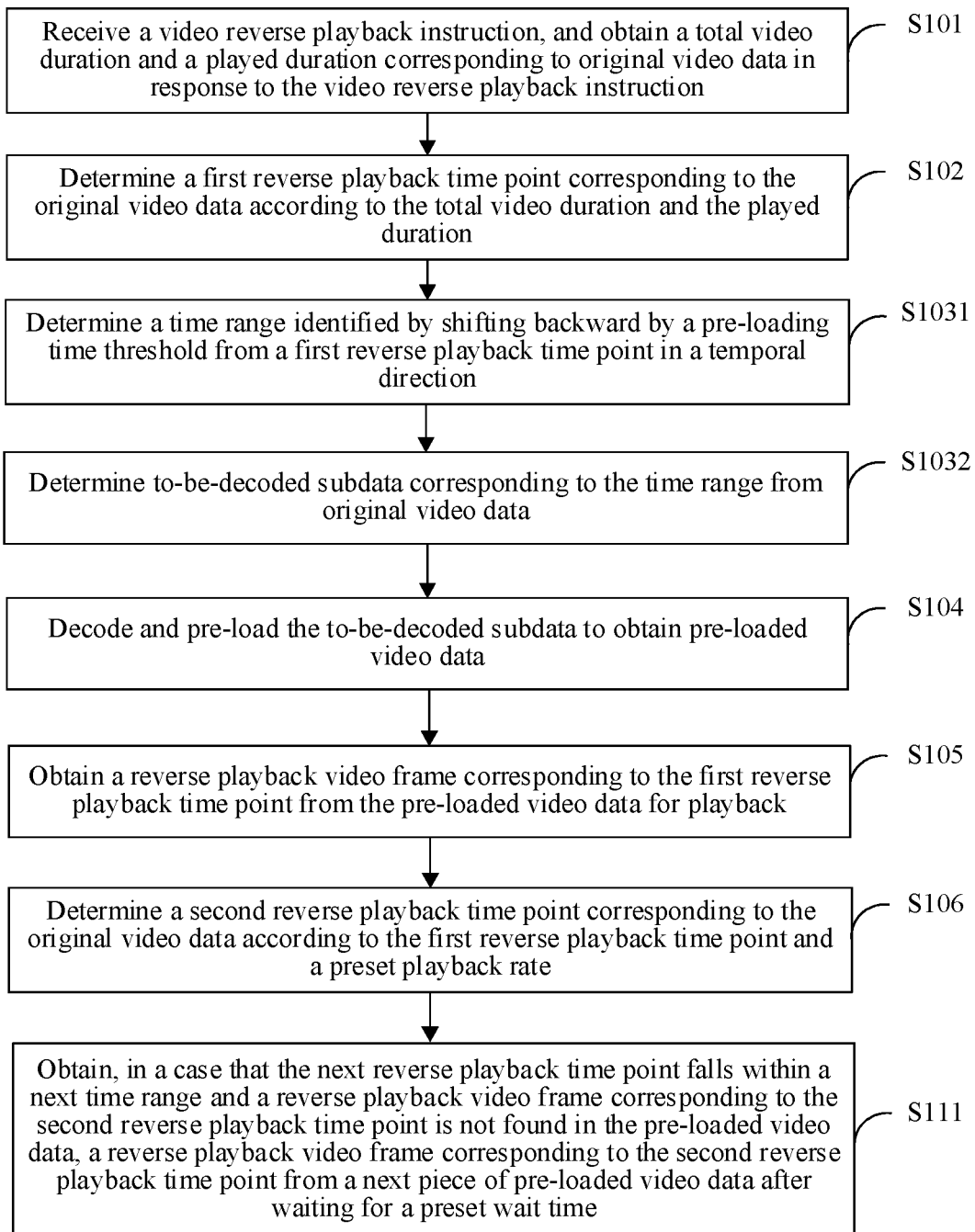
FIG. 9 is a flowchart of a video processing method according to an embodiment of this disclosure.

FIG. 9 is an exemplary schematic flowchart of a video processing method according to an embodiment of this disclosure. Based on FIG. 7, steps S111 and S112 are further included after step S106, and steps are combined for description.

In step S111, when the next reverse playback time point falls within a next time range and a reverse playback video frame corresponding to the second reverse playback time point is not found in the pre-loaded video data, a reverse playback video frame corresponding to the second reverse playback time point is obtained from a next piece of pre-loaded video data after waiting for a preset wait time.

In a possible implementation, a manner of waiting for the preset wait time may be a manner of displaying the reverse playback video frame corresponding to the first reverse playback time point for the preset wait time.

In this embodiment of this disclosure, after the terminal obtains the second reverse playback time point, there may be a situation that when a piece of pre-loaded video data (e.g., the pre-loaded video data) has been played and a next piece of pre-loaded video data needs to be supplemented, but the next piece of pre-loaded video data has not been loaded successfully due to time required for the next piece of preloaded video data to be loaded by using an asynchronous thread. In this case, a situation that there is no available pre-loaded video data occurs, and for this situation, the terminal needs to wait for the next piece of pre-loaded video data to be loaded successfully, and then performs a subsequent implementation.

In some embodiments of this disclosure, when the second reverse playback time point falls within the next time range, the reverse playback video frame corresponding to the second reverse playback time point is not found in the pre-loaded video data, and the next piece of pre-loaded video data is being obtained, and when the next piece of pre-loaded video data has been obtained after waiting for the preset wait time, a next reverse playback video frame is obtained from the next piece of pre-loaded video data.

That is, when the second reverse playback time point falls within the next time range, normally, the next reverse playback video frame is to be found in the loaded available pre-loaded video data. However, there may be a situation that the next piece of pre-loaded video data has not been loaded successfully within a temporary period of time due to the time required for loading by using the asynchronous thread. That is, the reverse playback video frame corresponding to the second reverse playback time point is not found in the pre-loaded video data and the next piece of pre-loaded video data is being obtained. In this case, the terminal may wait for the preset wait time, and obtain the reverse playback video frame corresponding to the second reverse playback time point from the next piece of pre-loaded video data after the next piece of pre-loaded video data has been loaded successfully. The preset wait time is a time required for the next piece of pre-loaded video data to be loaded successfully.

In some embodiments of this disclosure, when the second reverse playback time point falls within the next time range, the reverse playback video frame corresponding to the second reverse playback time point is not found in the pre-loaded video data, and the next piece of pre-loaded video data is being obtained, and after the reverse playback video frame corresponding to the first reverse playback time point is displayed for the preset wait time, a next reverse playback video frame is obtained from the next piece of pre-loaded video data.

That is, when the second reverse playback time point falls within the next time range, normally, the reverse playback video frame corresponding to the second reverse playback time point is to be found in the loaded available pre-loaded video data. However, there may be a situation that the next piece of pre-loaded video data has not been loaded successfully within a temporary period of time due to the time required for loading by using the asynchronous thread. That is, the next reverse playback video frame is not found in the pre-loaded video data and the next piece of pre-loaded video data is being obtained. In this case, the terminal may still play the reverse playback video frame that has been displayed latest corresponding to the first reverse playback time point during the preset wait time required for the next piece of pre-loaded video data to be loaded successfully.

For a situation that a plurality of reverse playback video frames have been played, and before a next piece of pre-loaded video data has been loaded, the terminal may alternatively obtain several reverse playback video frames that have been played in an upcoming time again for playback during waiting for the next piece of pre-loaded video data to be loaded successfully. A quantity of the reverse playback video frames is not limited in this embodiment of this disclosure, but the quantity is less than or equal to a length of the preset wait time.

It may be understood that, in a special situation that pre-loaded video data has not been loaded successfully, the terminal may wait for or play reverse playback video frames that have been played first, to avoid a problem of getting stuck in a video processing, thereby improving the completeness of the video processing and improving the availability of the reverse playback function.

Figure 10:
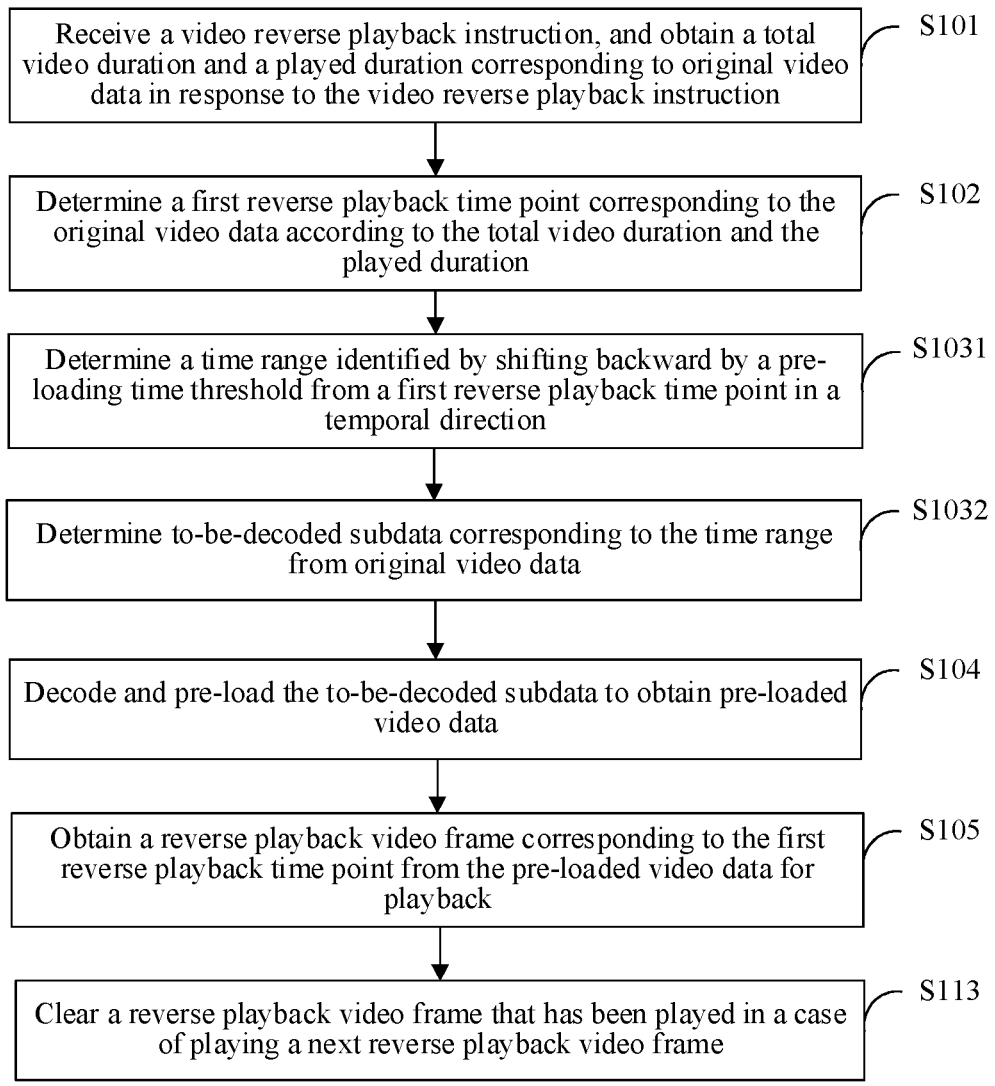
FIG. 10 is a flowchart of a video processing method according to an embodiment of this disclosure.

FIG. 10 is an exemplary schematic flowchart of a method according to an embodiment of this disclosure. Based on FIG. 3, step S113 is further included after step S105, and steps are combined for description.

In step S113, a reverse playback video frame that has been played is cleared in a case of playing a next reverse playback video frame.

After each reverse playback video frame is played, when the terminal is playing a next reverse playback video frame, because the previous reverse playback video frame has been played and the next reverse playback video frame has already been obtained, in this case, the terminal may delete or clear the reverse playback video frame that has been played.

In some embodiments of this disclosure, a video frame and a next reverse playback video frame are adopted for description. After the video frame is played and when the next reverse playback video frame is obtained, the terminal may clear the reverse playback video frame in the buffer when playing the next reverse playback video frame.

In this embodiment of this disclosure, when the terminal is playing a reverse playback video frame that is not the first reverse playback video frame, the terminal may first clear a previous reverse playback video frame in the buffer.

It may be understood that, the reverse playback video frame that has been played may be cleared from the buffer in a next reverse playback process, and therefore, an internal memory buffering reverse playback video frames may be maintained within a relatively small and fixed value range, and the occupancy of the internal memory does not increase with the increase of processing data, thereby improving the utilization of the internal memory and reducing the occupancy of the internal memory to some extent.

The following describes an exemplary application of this embodiment of this disclosure in an actual application scenario.

Figure 11:
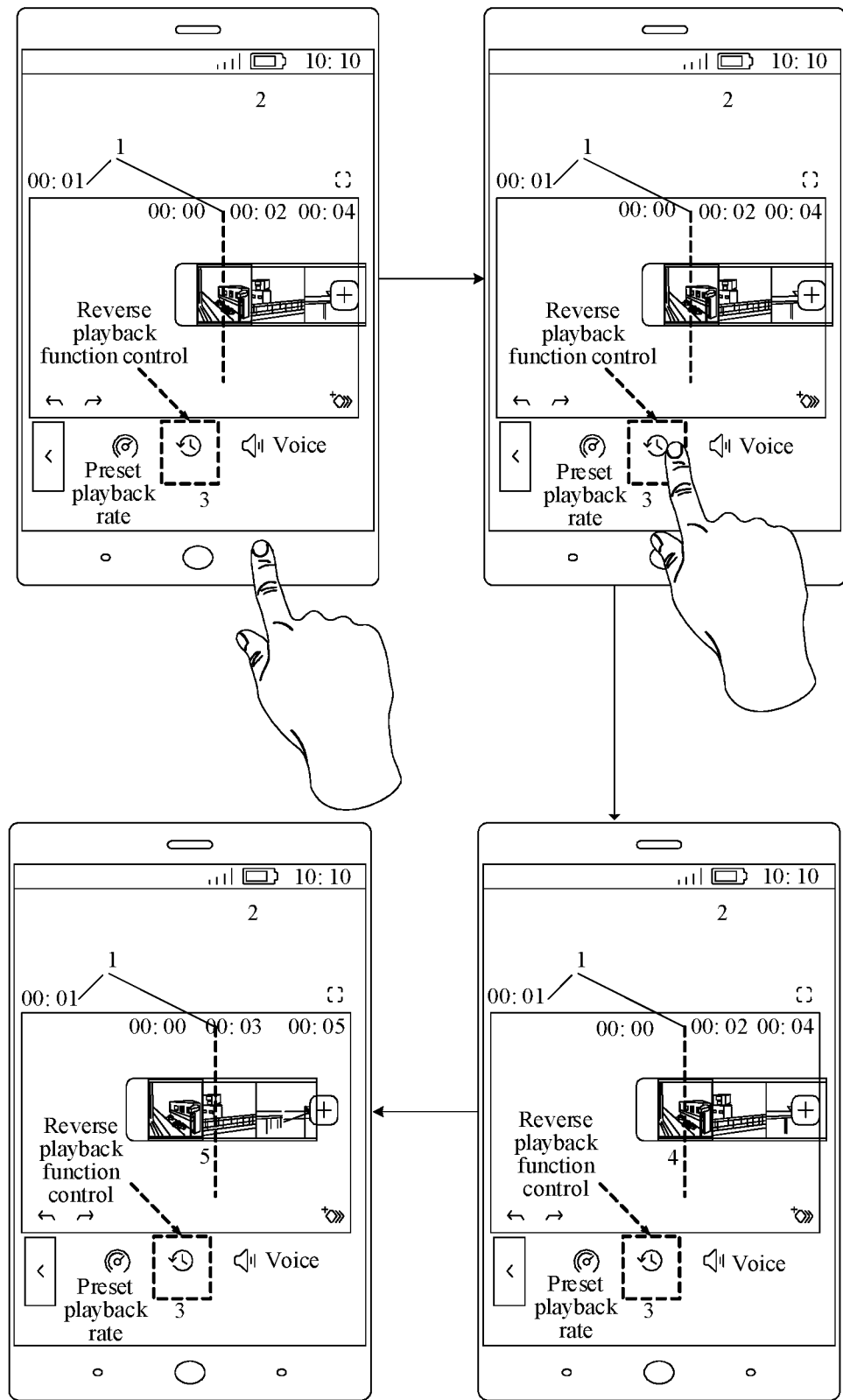
FIG. 11 is a schematic diagram of an exemplary scenario according to an embodiment of this disclosure.

As shown in FIG. 11, when a video reverse playback is performed by using a mobile phone (e.g., a terminal), a user taps a reverse playback function control 3 in a video playback interface 2 to generate a video reverse playback instruction, and in response to the video reverse playback instruction, the mobile phone may calculate a reverse playback time point according to a playback time 1 of a player, and a formula is that (a reverse playback time point=a total video duration-a playback time of a player), and then request to obtain video image data (reverse playback video data) according to the calculated reverse playback time point. Specifically, the mobile phone may calculate a time range of data required to be pre-loaded according to the reverse playback time point obtained this time. For example, if a duration of an original video is 5 s and video frames in a time length of 0.5 s needs to be pre-loaded when the video is played to 1 s, video frames during 4 s–3.5 s need to be decoded, and then, an asynchronous thread is performed to pre-load the video frames during this period of time to obtain video image data loaded from the buffer and video image data 4 at 4 s is played. As a time of the player keeps running, at a next reverse playback time point, priority is given to finding whether a next piece of video image data of the next reverse playback time point exists in the buffer. If the next piece of video image data exists, the buffered next piece of video image data 5 is directly obtained and played, otherwise, a next piece of video image data from the next reverse playback time point to 0.5 s is directly pre-loaded, and the next piece of video image data is obtained and played. In addition, after video image data of a reverse playback time point is obtained from the buffer each time, each video image with a time greater than the time point may be removed to reduce the internal memory overhead.

Figure 12:
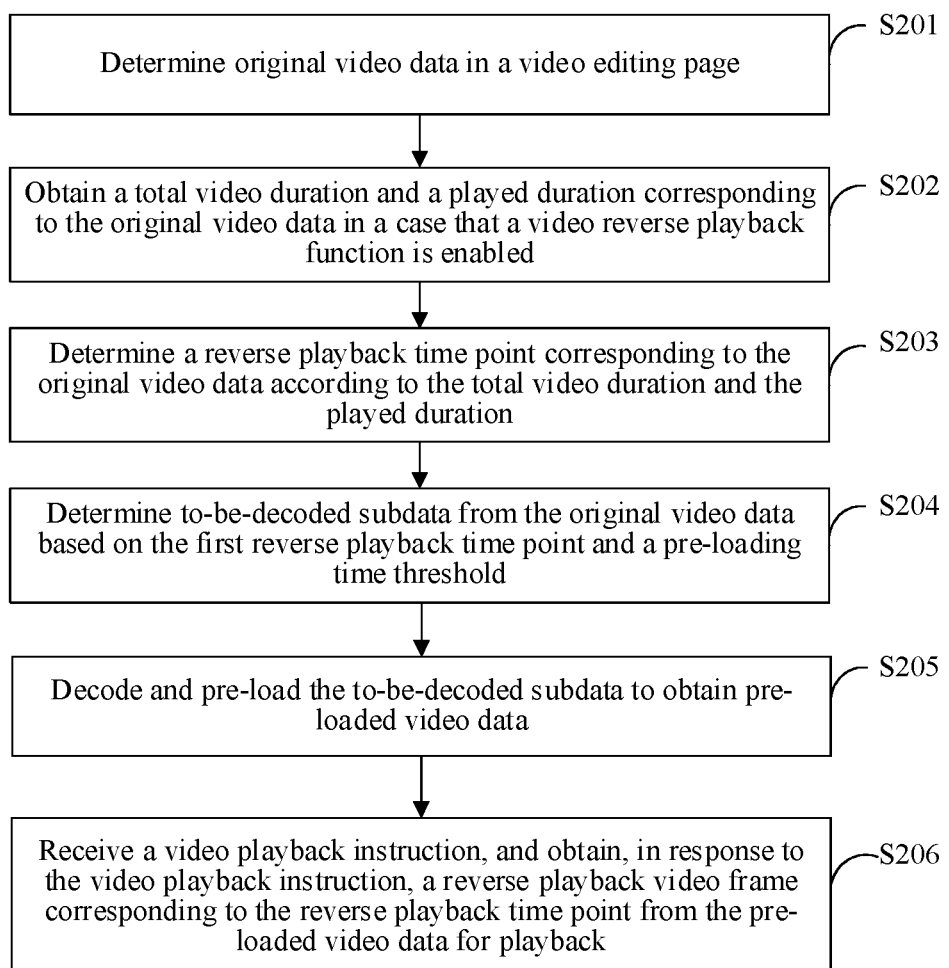
FIG. 12 is a flowchart of another video processing method according to an embodiment of this disclosure.

FIG. 12 shows an exemplary video processing method according to some embodiments of this disclosure. The method may further include the following steps.

In step S201, original video data is determined in a video editing page.

In step S202, a total video duration and a played duration corresponding to the original video data is obtained when a video reverse playback function is enabled.

In step S203, a reverse playback time point corresponding to the original video data is determined according to the total video duration and the played duration.

In step S204, to-be-decoded subdata from the original video data is determined based on the first reverse playback time point and a pre-loading time threshold, the to-be-decoded subdata being video data that falls within the time range in the original video data.

In step S205, the to-be-decoded subdata is decoded and pre-loaded to obtain pre-loaded video data.

In step S206, a video playback instruction is received. Further, in response to the video playback instruction, a reverse playback video frame corresponding to the reverse playback time point is obtained from the pre-loaded video data for playback.

In this embodiment of this disclosure, the terminal may further implement the video reverse playback function in an application of editing a video or processing a video.

In this embodiment of this disclosure, the terminal may select to-be-processed original video data in the video editing page or a video editing interface. That is, the terminal determines processed original video data, and then various functions may be set for video processing in the video editing interface, for example, a video reverse playback function, a video acceleration function, or a video deceleration function. When the user selects to perform the video reverse playback function on the original video data, the terminal may obtain pre-loaded video data by using a total video duration, a played duration, and a pre-loading time threshold corresponding to the original video data. Then the terminal may play a part of edited video while editing. In this case, the terminal may obtain a reverse playback video frame corresponding to a reverse playback time point from the pre-loaded video data for playback, and the terminal continues to obtain a next piece of pre-loaded video data, and therefore, the terminal may play the entire original video data in a reverse playback manner.

A process that the terminal processes the original video data to obtain the pre-loaded video data is described in the foregoing embodiment, and details are not repeated herein.

In some embodiments of this disclosure, after the terminal obtains the pre-loaded video data, the method further includes the following steps.

In a first step, the terminal can continue to obtain a next piece of pre-loaded video data until at least one piece of pre-loaded video data corresponding to the original video data is obtained.

In a second step, the at least one piece of pre-loaded video data can be exported.

After the terminal obtains the pre-loaded video data, the terminal may further continue to obtain a next piece of pre-loaded video data, until at least one piece of pre-loaded video data corresponding to the original video data has been obtained. In this case, the terminal receives an export instruction, and may directly export a piece of reversed video data, that is, the at least one piece of pre-loaded video data, in response to the export instruction.

The terminal may display a reverse playback function by using a function key or a function control in the video editing page.

It may be understood that, when performing reverse playback processing on the original video data, the terminal may process and play reverse playback video frames at the same time or may process and export video frames section by section by using the method according to this embodiment of this disclosure for playback as required. By decoding original video data within a specific range by using this processing manner, the time of internal memory occupation is reduced, and pre-loaded video data within a specific range (a time range) has been pre-loaded, and a reverse playback video frame may be directly obtained from the pre-loaded video data at a reverse playback time point for playback, thereby shortening the video playback procedure, improving the processing speed, and achieving an effect of reducing the processing time. In addition, at least one piece of pre-loaded video data may be exported, which balances the obtaining of video data that has all been reversely played and the subsequent function playback, thereby improving the compatibility.

Figure 13:
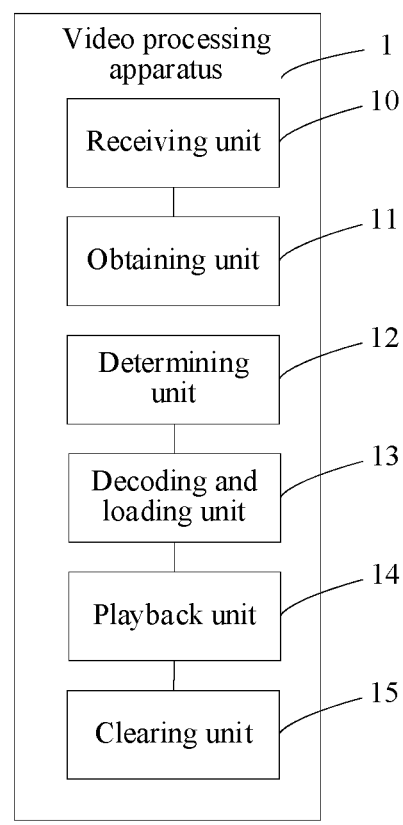
FIG. 13 is a schematic structural diagram of a video processing apparatus according to an embodiment of this disclosure.

The following illustrates an exemplary structure of a software module, and in some embodiments, as shown in FIG. 13, a software module in a video processing apparatus 1 may include a receiving unit 10, an obtaining unit 11, a determining unit 12, a decoding and loading unit 13, and a playback unit 14. One or more modules, submodules, and/or units of the apparatus can be implemented by processing circuitry, software, or a combination thereof, for example.

The receiving unit 10 is configured to receive a video reverse playback instruction, the video reverse playback instruction being used for indicating original video data to be played in reverse order. The obtaining unit 11 is configured to obtain a total video duration and a played duration corresponding to the original video data in response to the video reverse playback instruction. The determining unit 12 is configured to determine a reverse playback time point corresponding to the original video data according to the total video duration and the played duration; and determine to-be-decoded subdata from the original video data based on a time range identified by the first reverse playback time point and a pre-loading time threshold, the to-be-decoded subdata being video data that falls within the time range in the original video data. The decoding and loading unit 13, configured to decode and pre-load the to-be-decoded subdata to obtain pre-loaded video data. The obtaining unit 11 is further configured to obtain a reverse playback video frame corresponding to the first reverse playback time point from the pre-loaded video data. Further, the playback unit 14 is configured to play the reverse playback video frame.

In some embodiments of this disclosure, the determining unit 12 is further configured to determine a time range identified by shifting backward by the pre-loading time threshold from the first reverse playback time point in a temporal direction; and determine the to-be-decoded subdata corresponding to the time range from the original video data.

In some embodiments of this disclosure, the decoding and loading unit 13 is further configured to decode the to-be-decoded subdata to obtain decoded original video subdata; and pre-load the decoded original video subdata by using an asynchronous thread to obtain the pre-loaded video data.

In some embodiments of this disclosure, the determining unit 12 is further configured to determine, after a reverse playback video frame corresponding to the first reverse playback time point is obtained from the pre-loaded video data for playback, a second reverse playback time point corresponding to the original video data according to the first reverse playback time point and a preset playback rate, the second reverse playback time point being a time point before the first reverse playback time point in the temporal direction; and read, when the second reverse playback time point falls within the time range, a reverse playback video frame corresponding to the second reverse playback time point from the pre-loaded video data for playback.

In some embodiments of this disclosure, the obtaining unit 11 is further configured to obtain, when the second reverse playback time point does not fall within the time range, a next piece of pre-loaded video data from the original video data based on the second reverse playback time point and the pre-loading time threshold, and read the reverse playback video frame corresponding to the second reverse playback time point based on the next piece of pre-loaded video data for playback.

In some embodiments of this disclosure, the video processing apparatus 1 further includes a clearing unit 15. The clearing unit 15 is configured to clear a reverse playback video frame that has been played in a case of playing a next reverse playback video frame.

In some embodiments of this disclosure, the obtaining unit 11 is further configured to obtain a remaining duration corresponding to remaining loaded video data that has not been played from the pre-loaded video data; and obtain, when the remaining duration is less than the pre-loading time threshold, a next piece of pre-loaded video data from the original video data based on the second reverse playback time point and the pre-loading time threshold, and based on the next piece of pre-loaded video data, perform a processing procedure for the reverse playback video frame corresponding to the second reverse playback time point.

In some embodiments of this disclosure, the obtaining unit 11 is further configured to determine, when the second reverse playback time point falls within a next time range and the next reverse playback video frame is not found in the pre-loaded video data, a reverse playback video frame corresponding to the second reverse playback time point from a next piece of pre-loaded video data after waiting for a preset wait time.

In some embodiments of this disclosure, the obtaining unit 11 is further configured to obtain the reverse playback video frame corresponding to the second reverse playback time point from the next piece of pre-loaded video data after the reverse playback video frame corresponding to the first reverse playback time point is displayed for the preset wait time.

It may be understood that, during a video reverse playback, the video processing apparatus only needs to determine to-be-decoded subdata based on the first reverse playback time point and the pre-loading time threshold, and decode and pre-load the to-be-decoded subdata. By decoding original video data within a specific range by using this processing manner, the time of internal memory occupation is reduced, and pre-loaded video data within a specific range has been pre-loaded, and a reverse playback video may be directly obtained from the pre-loaded video data at a reverse playback time point for playback, thereby shortening the video playback procedure, improving the processing speed, and reducing the processing time.

In addition, an embodiment of this disclosure further provides a storage medium such as a non-transitory computer-readable storage medium, the storage medium being configured to store program code, and the program code being configured to perform the video processing method according to the foregoing embodiments.

An embodiment of this disclosure further provides a computer program product including instructions, the computer program product, when run on a server, causing the server to perform the video processing method according to the foregoing embodiments.

In some embodiments, the storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable video processing instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (e.g., be stored in files of one or modules, subprograms, or code parts).

In an example, the executable video processing instructions can be deployed for execution on one computing device, execution on a plurality of computing devices located at one location, or execution on a plurality of computing devices that are distributed at a plurality of locations and that are interconnected by using a communication network.

The foregoing descriptions are merely embodiments of this disclosure and are not intended to limit the protection scope of this disclosure. Any modification, equivalent replacement, or improvement made without departing from the spirit and range of this disclosure shall fall within the protection scope of this disclosure.

What is claimed is:

1. A video processing method, comprising:
   receiving a video reverse playback instruction;
   obtaining a total video duration of a video and a played duration of the video in response to the video reverse playback instruction, the video reverse playback instruction indicating that the video is to be played in reverse order;
   determining a first reverse playback time point corresponding to the video according to a difference between the total video duration and the played duration;
   determining, by processing circuitry, subdata from video data of the video based on a time range indicated by the first reverse playback time point and a pre-loading time threshold, the subdata corresponding to the time range of the video;
   pre-loading the subdata to obtain pre-loaded video data; and
   obtaining a first reverse playback video frame corresponding to the first reverse playback time point from the pre-loaded video data for playback in the reverse order.

2. The method according to claim 1, wherein the determining the subdata comprises:
   determining the time range by shifting the first reverse playback time point backward by the pre-loading time threshold from the first reverse playback time point; and
   determining the subdata corresponding to the time range from the video data.

3. The method according to claim 1, wherein the pre-loading comprises:
   decoding the subdata to obtain decoded video subdata; and
   pre-loading the decoded video subdata by using an asynchronous thread to obtain the pre-loaded video data.

4. The method according to claim 1, wherein after the first reverse playback video frame is obtained, the method further comprises:
   determining a second reverse playback time point corresponding to the video according to the first reverse playback time point and a preset playback rate, the second reverse playback time point being before the first reverse playback time point; and
   reading, when the second reverse playback time point falls within the time range, a second reverse playback video frame corresponding to the second reverse playback time point from the pre-loaded video data for playback in the reverse order.

5. The method according to claim 4, further comprising:
   obtaining, when the second reverse playback time point does not fall within the time range, a next piece of pre-loaded video data from the video data based on the second reverse playback time point and the pre-loading time threshold; and
   reading the second reverse playback video frame corresponding to the second reverse playback time point based on the next piece of pre-loaded video data for playback in the reverse order.

6. The method according to claim 4, wherein after the second reverse playback video frame is read, the method further comprises:
   obtaining a remaining duration of the pre-loaded video data that has not been played;
   obtaining, when the remaining duration is less than the pre-loading time threshold, a next piece of pre-loaded video data from the video data based on the second reverse playback time point and the pre-loading time threshold; and
   performing a processing procedure for the second reverse playback video frame corresponding to the second reverse playback time point based on the next piece of pre-loaded video data.

7. The method according to claim 4, wherein after the second reverse playback time point is determined, the method further comprises:
   obtaining, when the second reverse playback time point falls within a next time range and the second reverse playback video frame is not found in the pre-loaded video data, the second reverse playback video frame corresponding to the second reverse playback time point from a next piece of pre-loaded video data after waiting for a preset wait time.

8. The method according to claim 7, wherein the obtaining the second reverse playback video frame corresponding to the second reverse playback time point from the next piece of pre-loaded video data comprises:
   obtaining the second reverse playback video frame corresponding to the second reverse playback time point from the next piece of pre-loaded video data after the first reverse playback video frame corresponding to the first reverse playback time point is displayed for the preset wait time.

9. The method according to claim 1, further comprising:
   clearing the first reverse playback video frame from memory when playing a next reverse playback video frame after the first reverse playback video frame.

10. A video processing method, comprising:
    determining a video in a video editing page;

obtaining a total video duration of the video and a played duration of the video when a video reverse playback function is enabled;

determining a first reverse playback time point corresponding to the video according to a difference between the total video duration and the played duration;

determining, by processing circuitry, subdata from video data of the video based on a time range indicated by the first reverse playback time point and a pre-loading time threshold, the subdata corresponding to the time range of the video;

pre-loading the subdata to obtain pre-loaded video data; and obtaining a first reverse playback video frame corresponding to the first reverse playback time point from the pre-loaded video data for playback in reverse order in response to a received video playback instruction.

11. A video processing apparatus, comprising:
processing circuitry configured to:
receive a video reverse playback instruction;
obtain a total video duration of a video and a played duration of the video in response to the video reverse playback instruction, the video reverse playback instruction indicating that the video is to be played in reverse order;
determine a first reverse playback time point corresponding to the video according to a difference between the total video duration and the played duration;
determine subdata from video data of the video based on a time range indicated by the first reverse playback time point and a pre-loading time threshold, the subdata corresponding to the time range of the video;
pre-load the subdata to obtain pre-loaded video data; and
obtain a first reverse playback video frame corresponding to the first reverse playback time point from the pre-loaded video data for playback in the reverse order.

12. The apparatus according to claim 11, wherein the processing circuitry is configured to:
determine the time range by shifting the first reverse playback time point backward by the pre-loading time threshold from the first reverse playback time point; and
determine the subdata corresponding to the time range from the video data.

13. The apparatus according to claim 11, wherein the processing circuitry is configured to:
decode the subdata to obtain decoded video subdata; and
pre-load the decoded video subdata by using an asynchronous thread to obtain the pre-loaded video data.

14. The apparatus according to claim 11, wherein after the first reverse playback video frame is obtained, the processing circuitry is configured to:
determine a second reverse playback time point corresponding to the video according to the first reverse playback time point and a preset playback rate, the second reverse playback time point being before the first reverse playback time point; and read, when the second reverse playback time point falls within the time range, a second reverse playback video frame corresponding to the second reverse playback time point from the pre-loaded video data for playback in the reverse order.

15. The apparatus according to claim 14, wherein the processing circuitry is configured to:
obtain, when the second reverse playback time point does not fall within the time range, a next piece of pre-loaded video data from the video data based on the second reverse playback time point and the pre-loading time threshold; and
read the second reverse playback video frame corresponding to the second reverse playback time point based on the next piece of pre-loaded video data for playback in the reverse order.

16. The apparatus according to claim 14, wherein after the second reverse playback video frame is read, the processing circuitry is configured to:
obtain a remaining duration of the pre-loaded video data that has not been played;
obtain, when the remaining duration is less than the pre-loading time threshold, a next piece of pre-loaded video data from the video data based on the second reverse playback time point and the pre-loading time threshold; and
perform a processing procedure for the second reverse playback video frame corresponding to the second reverse playback time point based on the next piece of pre-loaded video data.

17. The apparatus according to claim 14, wherein after the second reverse playback time point is determined, the processing circuitry is configured to:
obtain, when the second reverse playback time point falls within a next time range and the second reverse playback video frame is not found in the pre-loaded video data, the second reverse playback video frame corresponding to the second reverse playback time point from a next piece of pre-loaded video data after waiting for a preset wait time.

18. The apparatus according to claim 17, wherein the processing circuitry is configured to:
obtain the second reverse playback video frame corresponding to the second reverse playback time point from the next piece of pre-loaded video data after the first reverse playback video frame corresponding to the first reverse playback time point is displayed for the preset wait time.

19. The apparatus according to claim 11, the processing circuitry is configured to:
clear the first reverse playback video frame from memory when playing a next reverse playback video frame after the first reverse playback video frame.

20. A non-transitory computer-readable storage medium storing instructions which when executed by at least one processor cause the at least one processor to perform the method according to claim 1.

* * * * *